A. ANGST.
ELASTIC WHEEL.
APPLICATION FILED JUNE 1, 1909.

1,000,975.

Patented Aug. 22, 1911.

2 SHEETS—SHEET 1.

Witnesses:
H. C. Hunsberger
L. Lang

Inventor:
Adolf Angst
by B. Singer att.

A. ANGST.
ELASTIC WHEEL.
APPLICATION FILED JUNE 1, 1909.
1,000,975.
Patented Aug. 22, 1911.
2 SHEETS—SHEET 2.
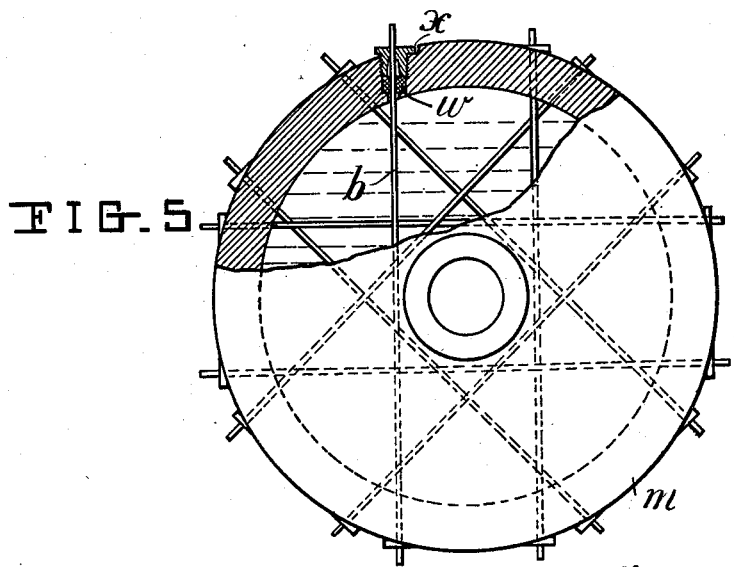
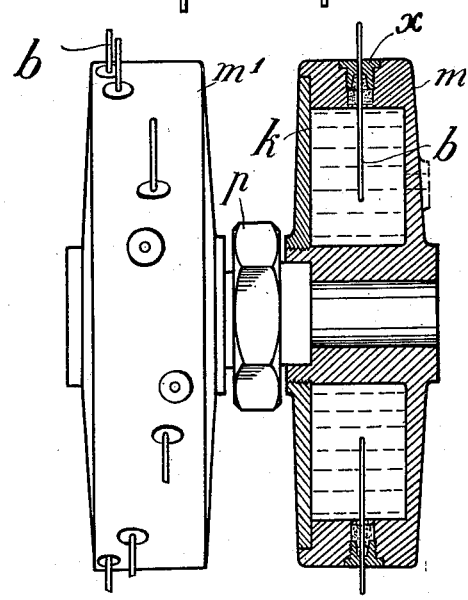
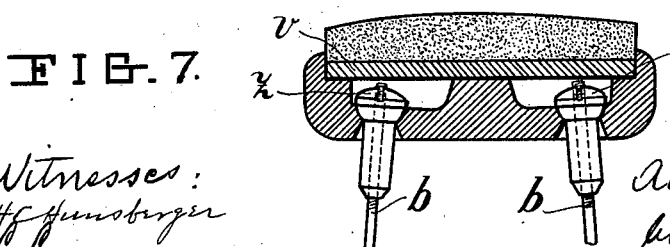

UNITED STATES PATENT OFFICE.

ADOLF ANGST, OF SCHAFFHAUSEN, SWITZERLAND.

ELASTIC WHEEL.

1,000,975.   Specification of Letters Patent.   Patented Aug. 22, 1911.

Application filed June 1, 1909. Serial No. 499,437.

*To all whom it may concern:*

Be it known that I, ADOLF ANGST, a citizen of the Swiss Republic, residing at Schaffhausen, in Switzerland, have invented a certain new and useful Improvement in Elastic Wheels, of which the following is a specification.

This invention consists of an elastic wheel having flexible spokes arranged in pairs symmetrically to the diameter, the said spokes being connected at both ends to the felly and drawn tight so that they are capable of affording elastic support to the hub. For this purpose the hub has guides which hold the spokes apart at distances enabling each spoke to be freely deflected without coming into contact with the other spokes. The spokes are loose in the said guides and are bent to varying degrees, according to the position of the wheel. The hub is incased to protect it from dirt, and means are provided for lubricating the guides. The resilience of the support of the hub can be altered and regulated by using spokes of different strength and thickness and by tightening or loosening the spokes.

Several constructions embodying the invention are shown in the accompanying drawing, in which—

Figure 1:
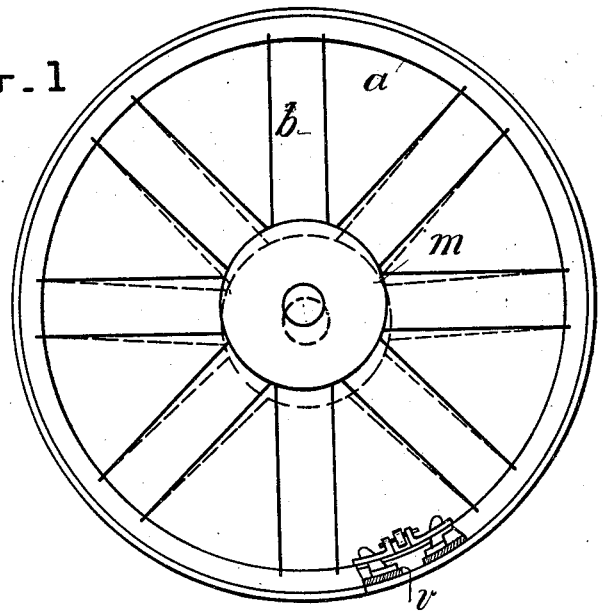
Figure 2:
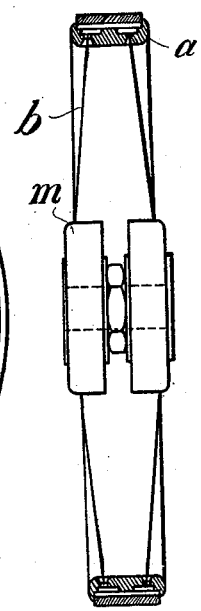

Figure 1 shows the arrangement of the spokes, the dotted lines indicating the deflection produced by the load. Fig. 2 is a partial section of Fig. 1, Fig. 3 a section of the hub on the line A—B of Fig. 4, and Fig. 4 a section on the line C—D of Fig. 3. Figs. 5 and 6 show a second form of construction of the hub partly in section. Fig. 7 is a section of the felly.

Figure 3:
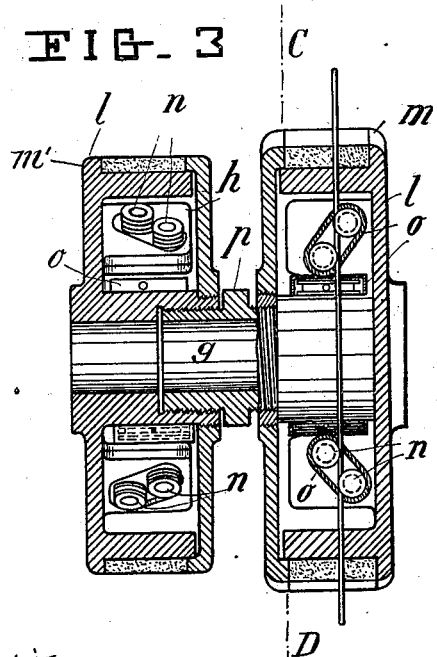
Figure 4:
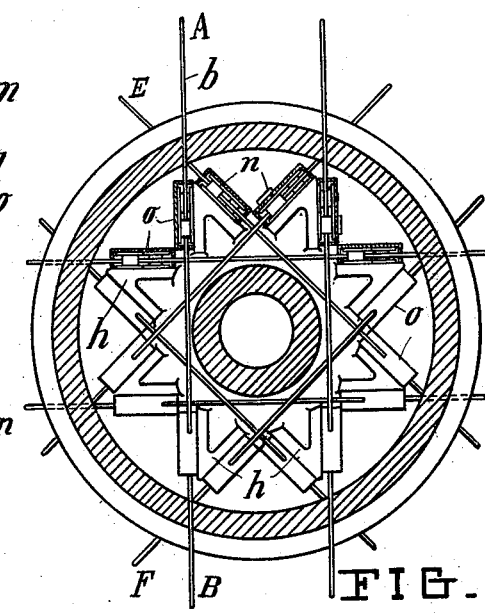

The rim $a$ has spokes $b$ of flexible material, for example steel-wire, arranged in pairs, parallel and symmetrically to diameters of the wheel. Each spoke extends across the wheel from one point of the felly to another and is made fast at its ends by suitable means, for example by means of nipples $z$ as in Fig. 7. The spokes support a hub, which may be made in one piece or may be bi-partite as shown in Figs. 2 and 3. In Figs. 2 and 3 each of the parts $m$ $m^1$ comprises a disk $l$ having projections $h$. The projections $h$ carry rollers $n$ arranged in pairs and flanged to loosely engage spokes $b$, the circumferential grooves of the rollers $n$ being preferably of a cross-section corresponding to that of the spokes. The pairs of rollers are staggered so that the spokes do not contact with each other at the points of intersection. Each pair of rollers is protected by a casing $o$ and the screws used for fastening the casing $o$ serve as pivots for the rollers $n$. For some classes of vehicles sockets $w$ of hard fiber or the like, fixed in the hub as shown in Fig. 5, may be used instead of rollers $n$. The parallel spokes belonging to each pair may both be in one plane of the wheel, or in different planes, as in Fig. 6. It is essential that the spokes do not clash with each other, or slide one upon the other, when deflected. The hub is inclosed in a casing, or protected by boxes $k$, containing a lubricant, for example oil or grease. The hub may have stuffing boxes $x$ (Figs. 5 and 6) where traversed by the spokes, to prevent loss of lubricant and entrance of dirt. Instead of stuffing boxes other means may be used for these purposes, for example a leather band (Figs. 3 and 4) traversed by the spokes to which it is fixed and concentric with the felly.

Preferably the two parts $m$ and $m^1$ of the felly are so disposed as to bring the spokes out of transverse alinement relatively to each other. They may be joined together by a screw $g$ having a collar $p$ which enables the parts $m$ and $m^1$ to be thrust apart for the purpose of tightening the spokes.

When a load is placed on the wheel the spokes perpendicular to the direction of the force due to the load are subjected to the greatest strain, and the spokes parallel with the force are subjected to least strain. The spokes in intermediate positions bear a proportional share of the load. If the wheel is subjected to eccentric pressure, the said pressure is transmitted to the spokes $b$ by the rollers or sockets.

To allow of rapidly renewing individual spokes and the tire or tread-cover of the wheel, a band $v$ of any suitable material such as leather is placed over the nipples holding the spokes, the ends of this band being held together by a tensioning device of any suitable known type.

The resilience afforded by the elastic spokes is very great.

What I claim as my invention and desire to secure by Letters Patent of the United States is:—

1. In a wheel, the combination with a hub and rim, of a plurality of resilient one piece rods each equal in length to the diameter of the rim and each extending across the wheel at one side of the hub, means for securing the ends of the rods to the rim, and rotative elements mounted on the hub and engaging said rods whereby the hub is held in concentric relation within and with respect to the rim.

2. In a wheel, the combination with a hub and rim, of a plurality of resilient one piece rods each equal in length to the diameter of the rim and each extending across the wheel at one side of the hub, means for securing the rods to the rim, and a plurality of rollers mounted on the hub, two for each rod arranged to engage the respective rod on opposite sides, whereby the hub is held in concentric relation within and with respect to the rim.

3. In a wheel, the combination with a hub and rim, of a plurality of resilient rods connected with the rim and arranged in crossed or angular relation with respect to each other, and anti-friction means on said hub engaging said rods to support the hub and maintain crossed portions of said rod out of contact with each other when deflected under the load.

4. In a wheel, the combination with a hub and rim, of a plurality of resilient rods connected with the rim and arranged in crossed or angular relation with respect to each other, and a plurality of anti-friction devices arranged in staggered order on said hub and engaging said rods to support the hub centrally of the rim and maintain crossed portions of said rod out of contact when deflected under the load.

In witness whereof I have signed this specification in the presence of two witnesses.

ADOLF ANGST.

Witnesses:
GEORGE ROTH,
CARL GUBLER.

---

Copies of this patent may be obtained for five cents each, by addressing the "Commissioner of Patents, Washington, D. C."